Nov. 10, 1931.    K. KRUENING    1,831,626
LENS MOUNT
Original Filed Jan. 25, 1928
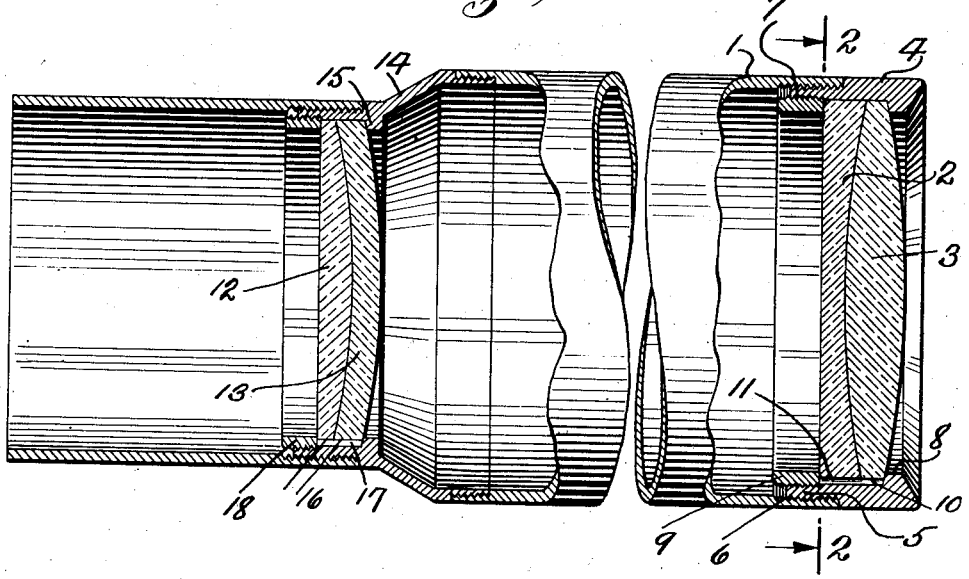
Fig. 1,
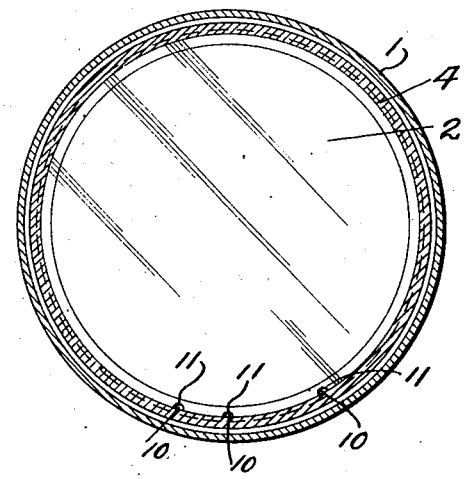
Fig. 2,
INVENTOR.
Karl Kruening.
BY
Kiddle, Marquess and Horridge
ATTORNEYS.

Patented Nov. 10, 1931

1,831,626

UNITED STATES PATENT OFFICE

KARL KRUENING, OF JAMAICA, NEW YORK, ASSIGNOR TO KOLLMORGEN OPTICAL CORPORATION, OF BROOKLYN, NEW YORK, A CORPORATION OF NEW YORK

LENS MOUNT

Original application filed January 25, 1928, Serial No. 249,223. Divided and this application filed July 18, 1929. Serial No. 379,136.

This invention relates to mounts for lenses and has particular reference to the mounting of projection lenses in the motion picture industry, although of course not limited to this industry. In such a lens system four lenses are usually employed, one pair being cemented together and termed the front element, while the other two are usually uncemented and for descriptive purposes will be referred to herein as the rear element. Inasmuch as these lenses must be removed from their mounts from time to time for cleaning purposes care must be exercised in placing them in position again in correct relation to each other and oftentimes through carelessness the lenses are reversed resulting in images of very poor quality.

The present invention has for one of its objects the provision of a construction whereby such a possibility is overcome. In other words, the present invention provides a construction whereby the lenses will necessarily be inserted in correct position at all times.

In the drawings accompanying this application:

Fig. 1 is a view in side elevation partly in section of a lens system constructed in accordance with my invention; and Fig. 2 is a section on the line 2—2 of Fig. 1.

Referring to the drawings in detail, 1 designates the lens tube of my improved mount. The front element of this apparatus is composed of two lenses 2 and 3 which as above mentioned and as illustrated are cemented together. Threaded into the forward end of the tube 1 is a retaining ring 4 provided with a reduced portion 5 threaded externally as indicated at 6 and internally as indicated at 7. The retaining ring 4 is provided adjacent its outer end with a shoulder 8 which is conveniently provided by reducing the diameter of the interior of the ring at this point.

The lenses 2 and 3 above referred to fit within the retaining ring 4 and are slipped into the ring from the inner end thereof until they abut the shoulder 8. A clamping ring 9 screws into the inner end of the retaining ring 4 and as will be seen from the drawings clamps the lenses 2 and 3 as a unit against the shoulder 8 provided in the retaining ring 4 so as to hold the lenses securely and firmly in position.

In order that the lenses may not be reversed and must always be placed in the retaining ring 4 in correct position, the interior of the retaining ring is provided with inwardly extending projections or ribs 10, these ribs extending lengthwise of the ring 4. The projections or ribs may take various forms but are inwardly spaced from each other as appears from an inspection of Fig. 2.

The lenses 2 and 3 are provided in their periphery with slots 11 which are spaced unequally but correspondingly to the spacing of the projections or ribs 10 so that the lenses are necessarily placed in their correct position when inserted in the ring 4 inasmuch as if the lenses were not placed in correct position, that is reversed or otherwise displaced, the grooves or slots 11 in their peripheries would not register with the projections or ribs 10 and it would be impossible to insert the lenses into the retaining tube or retaining ring.

The rear element of my improved construction comprises lenses 12 and 13. These lenses are of a different diameter than the front element and hence not interchangeable therewith. 14 designates a retaining tube threaded into the lens tube 1. This retaining tube is provided internally with a shoulder 15. The lenses 12 and 13 which as above noted are not cemented to each other have their peripheries notched as at 16. These notches are unequally spaced and cooperate with unequally spaced ribs 17 projecting inwardly within the retaining tube 14. The number of notches and ribs, or their equivalent, for the lens 13 differs from that of the lens 12, from which it will be evident that reversal of these two lenses is effectually prevented.

The lenses are held in position in the retaining tube 14 by a clamping ring 18 which screws into the internally threaded end of the retaining tube 14. This clamping ring is of such a length that if the lenses 12 and 13 are interchanged the ring cannot be screwed into its bearing.

From the foregoing it will be seen that the front and rear elements of my improved lens system are non-interchangeable owing to their difference in diameter.

It is to be noted also that by spacing the ribs 10 and slots 11 of the front element differently from the spacing of the ribs and slots 11 of the rear element the two sets of lenses cannot be interchanged even though they were all of the same diameter. It will be evident also that my construction prevents reversal of the lenses of each element.

This application is a division of my copending application Serial No. 249,223, filed January 25, 1928.

What I claim is:—

1. In projector apparatus the combination of a lens retaining ring, inwardly projecting unequally spaced members on said ring, a pair of lenses provided with unequally spaced slots receiving said projections and corresponding with the unequal spacing thereof, a clamping ring for clamping said lenses in said retaining ring, the unequal spacing of said projections, and said lens slots preventing reversal of the lenses.

2. In projector apparatus the combination of a lens retaining ring, a lens having spaced slots in the periphery thereof, a clamping ring for clamping said lens in the retaining ring, unequally spaced projections on the interior of said retaining ring, the spacing of the slots in the periphery of the lens corresponding with the unequal spacing of the projections on the interior of the retaining ring, said slots and projections cooperating for positively positioning the lens in the ring and preventing its reversal.

3. In projector apparatus the combination of a lens retaining ring, inwardly extending unequally spaced projections on said ring, a lens having unequally spaced slots for receiving said projections, a clamping ring, a shoulder on said retaining ring against which the lens is clamped by said clamping ring, the said projections and lens slots preventing reversal of the lens in the retaining ring.

4. In projector apparatus the combination of a pair of separable lenses, an internally shouldered retaining tube for receiving said lenses, said retaining tube being provided with two sets of inwardly extending projections, one set cooperating with one of said lenses, the other set cooperating with the other of said lenses, the spacing of the projections of one set differing from the spacing of the projections of the other set whereby transposing of the lenses in the retaining tube is prevented, and a clamping ring for holding said lenses against said shoulder.

This specification signed this 12 day of July, 1929.

KARL KRUENING.